United States Patent

Yamagishi

[11] Patent Number: 5,867,176
[45] Date of Patent: Feb. 2, 1999

[54] METHOD OF REPRODUCING PICTURES BY FAST FORWARD AND FAST BACKWARD REPRODUCTION FROM MOVING PICTURE DATA CODED AT HIGH EFFICIENCY

[75] Inventor: Tooru Yamagishi, Yokohama, Japan

[73] Assignee: Victor Company of Japan, Ltd., Yokohama, Japan

[21] Appl. No.: 679,665

[22] Filed: Jul. 12, 1996

[30] Foreign Application Priority Data

Jul. 13, 1995 [JP] Japan .................................. 7-200480

[51] Int. Cl.[6] .................................................. H04N 5/781
[52] U.S. Cl. .......................... 345/473; 345/302; 386/111
[58] Field of Search .................................. 345/473, 474, 345/475, 302, 5, 6, 20, 68, 69, 70, 111; 348/17, 19

[56] References Cited

U.S. PATENT DOCUMENTS

| 5,282,049 | 1/1994 | Hatakenaka et al. | 386/111 |
| 5,513,011 | 4/1996 | Matsumoto et al. | 368/98 |
| 5,521,630 | 5/1996 | Chen et al. | 348/7 |
| 5,535,008 | 7/1996 | Yamagishi et al. | 386/109 |
| 5,589,993 | 12/1996 | Naimpally | 386/81 |
| 5,642,338 | 6/1997 | Fukushima et al. | 369/59 |
| 5,659,539 | 8/1997 | Porter et al. | 395/200.61 |

FOREIGN PATENT DOCUMENTS

| 0 396 285 | 11/1990 | European Pat. Off. . |
| 0 606 868 | 7/1994 | European Pat. Off. . |
| 0 667 713 | 8/1995 | European Pat. Off. . |
| 6-276485 | 9/1994 | Japan . |
| WO94/07332 | 3/1994 | WIPO . |

OTHER PUBLICATIONS

Chang et al., "Variable bit rate MPED video storage on parallel disk arrays", Community Networking Integrated Multimedia Service, 1994 Workshop, pp. 127–137.

*Primary Examiner*—Stephen S. Hong
*Attorney, Agent, or Firm*—Jacobson, Price, Holman & Stern, PLLC

[57] ABSTRACT

Picture data are reproduced by fast forward (F.F.) or fast backward (F.B.) reproduction from moving picture data including picture frames belonging to the first picture frame group obtained by compressing picture data in accordance with intra-frame method and picture frames belonging to the second picture frame group obtained by compressing picture data in accordance with inter-frame prediction method and further coded at a high efficiency by a high efficiency compression system. During the real time reproduction, an average interval between two adjacent picture frames belonging to the first frame group is obtained. Further, during F.F. or F.B. reproduction, a search start position of a first picture frame to be next reproduced after a second picture frame now being reproduced is set based on the obtained average interval, the first and second picture frames belonging to the first picture frame group, and the first picture frame is started to be searched from the set search start position.

8 Claims, 3 Drawing Sheets

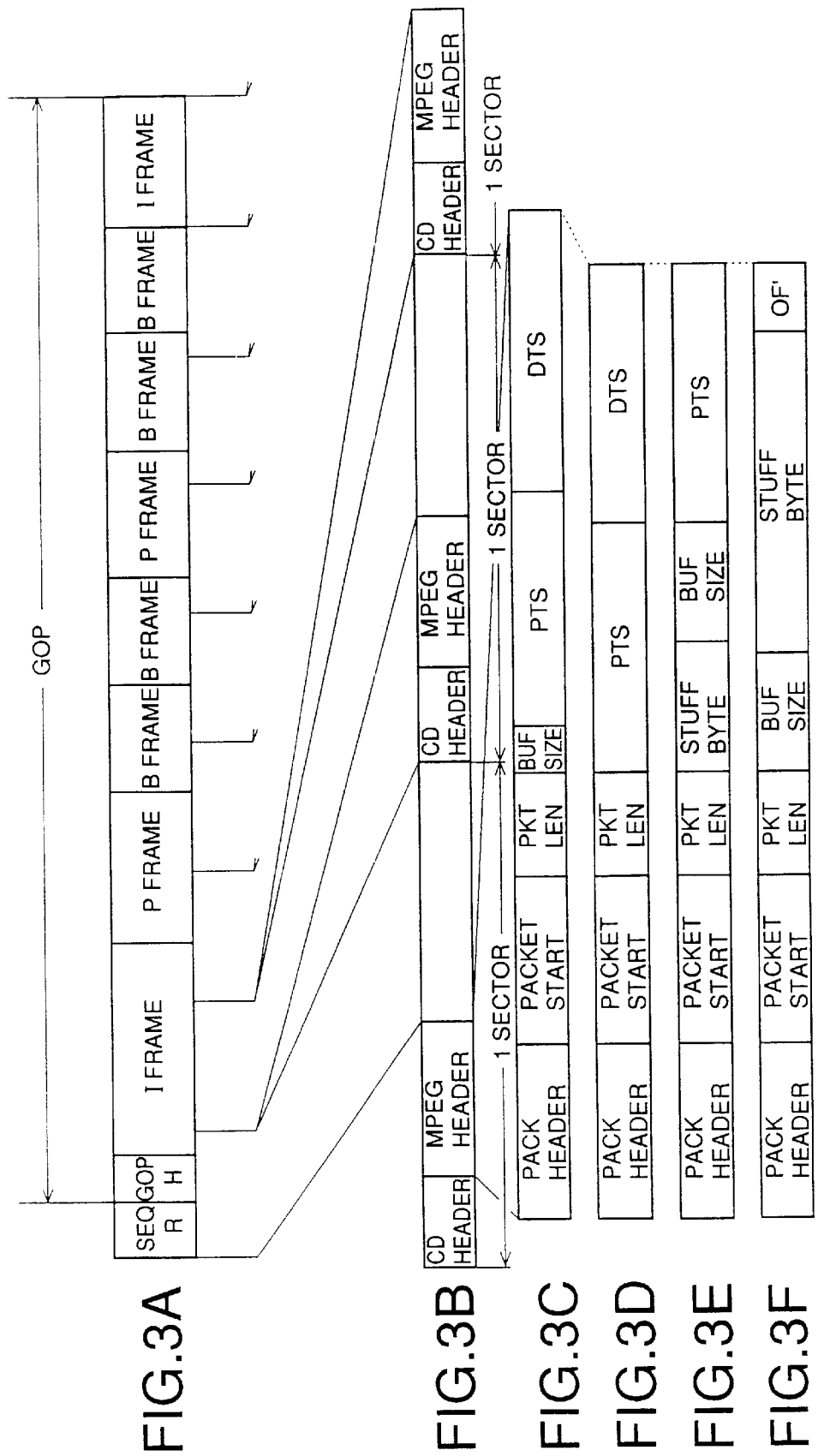

METHOD OF REPRODUCING PICTURES BY FAST FORWARD AND FAST BACKWARD REPRODUCTION FROM MOVING PICTURE DATA CODED AT HIGH EFFICIENCY

BACKGROUND OF THE INVENTION

The present invention relates to a method of reproducing pictures by fast forward (F.F.) and fast backward (F.B.) reproduction on the basis of moving picture data coded at high efficiency. More specifically, the present invention relates to a method of reproducing pictures by selectively reproducing only picture frame data compressed in accordance with intra-frame method from moving picture data coded at a high efficiency in F.F. and F.B. reproduction. Here, the moving picture data consists of picture frames whose picture data are compressed in accordance with intra-frame method and picture frames whose picture data are compressed in accordance with inter-frame prediction method.

Various high efficiency compression systems for compressing moving picture signals at a high efficiency before transmitting, recording and reproducing the moving picture signals have been widely so far researched and proposed. As one of these systems, there has been proposed a high efficiency compression coding system. Picture data compressed by this system consists of picture frames whose picture data are compressed in accordance with intra-frame method and picture frames whose picture data are compressed in accordance with inter-frame prediction method.

Further, it has been already tried to record moving picture data compressed at a high efficiency on a small-sized disk. On the other hand, MPEG (moving pictures expert group) has proposed various data formats related to the high efficiency compressed picture data in sequence. This proposition is to prepare an international standard related to the systems of compressing picture data by coding moving video signals at a high efficiency. Accordingly, there have been widely researched and developed various apparatus for transmitting, recording and reproducing moving picture data compressed at a high efficiency in accordance with the data formats proposed by the MPEG, that is, moving picture data compressed at a high efficiency in accordance with the MPEG system.

On the other hand, in the field of the moving picture data coding system (MPEG system) for media (e.g., CD-ROM) for recording digital data, moving video signals are now compressed at a high efficiency by adopting a prediction coding method, in the same way as with the case of the high efficiency coding system discussed above.

As the prediction method, in this case, three sorts of picture modes are adopted as follows: intra-picture frame (referred to as I frame, hereinafter) by which picture data are compressed at a high efficiency on the basis of the intra-frame coding method; predicted-picture frame (referred to as P frame, hereinafter) by which video signals are compressed at a high efficiency on the basis of the inter-frame prediction coding method using a past frame picture data; and bi-directional prediction picture frame (referred to as B frame, hereinafter) by which video signals are compressed at a high efficiency on the basis of the inter-frame prediction coding method using both past and future frame picture data.

Further, a header is attached to the digital picture data whose frames are arranged in a predetermined arrangement mode on the time axis, in order to obtain the picture coded data.

In the above-mentioned MPEG system, since CCIR (ITU-R) has been also standardized, the MPEG system will be explained hereinbelow as an example of the high efficiency compression systems for moving picture signals having I, P, and B frames.

Now, in the MPEG system, the mutual relationship among the picture data compression ratio CI of I frames, the picture data compression ratio CP of P frames, and the picture data compression ratio CB of B frames is determined as CI<CP<CB. Further, the picture reproduction must be started beginning from a sequence header as an entry point. Further, in the case of B-frame reproduction (picture data are predicted on the basis of picture data of past and future frames), the picture data of the future P frame used for prediction of the picture data of a B frame must be recorded in front of the B frame.

A picture reproducing apparatus follows the steps shown in FIG. 1 to reproduce pictures by F.F. or F.B. reproduction on the basis of the moving picture data coded at high efficiency in accordance with the MPEG system. In practice, whenever data indicative of the F.F. or F.B. reproduction mode is entered, a central arithmetic processing unit (CPU) of the picture reproducing apparatus executes the sequential operations, in accordance with the respective steps as shown by the step S5 and after in FIG. 1.

FIG. 1 shows the procedure of F.F. or F.B. reproduction of pictures on the basis of the moving picture data coded at high efficiency by the MPEG system. When the procedure of FIG. 1 starts, in response to a command of CPU, a disk drive moves an optical head for seek operation. Data read by the optical head are once stored in a buffer memory. The stored data are read out to supply a bit stream to an MPEG video decoder. The MPEG video decoder detects and decodes I frames by checking the whole supplied bit stream. Whenever the MPEG video decoder completes one I frame decoding operation, the completion of the operation is informed to the CPU. Then, the CPU gives a command to the disk drive unit in such a way that the optical head can seek a position at which the succeeding I frame may exists.

Therefore, whenever picture data of the succeeding I frames are reproduced, a sum total time of the three periods of time as follows is required: (1) a period of time required to skip to a bit stream position at which the succeeding picture reproduction is to be started; (2) a period of time required to detect an I frame after the bit stream reproduction has been started from the skipped position; and (3) a period of time required to reproduce the detected total I frame. In this case, however, intervals between the succeeding I frames are not constant but different each other in the bit stream with I, P, and B frames.

Therefore, the skipped position of the bit stream at which the succeeding picture reproduction is to be started may be determined at a position far enough ahead from the position at which an I frame is supposed to exist. The I frame is detected after the bit stream reproduction has been started from the skipped position. As a result, a time required to detect the I frame may be increased, so that the number of reproduced pictures per predetermined period of time is reduced and thereby the motion of the reproduced picture is not smoothed sufficiently. This problem arises in any high efficiency compression systems for moving picture signals with I, P, and B frames in the same way as with the case of the above-mentioned MPEG system.

To overcome this problem, the applicant has already proposed such a method of reproducing pictures by F.F. and F.B. reproduction from high efficiency coded moving picture data in Japanese Patent Laid-Open No. 6(1994)-276485.

In this method, I frames are previously arranged in the bit stream in such a way that an averaged interval between the I frames becomes a previously determined constant value. This I frame arrangement is good to select only I frame pictures from the high efficiency coded moving picture data in order to display I frame pictures at a predetermined constant interval.

In the case of F.F. reproduction, the succeeding I frame to be reproduced after an I frame now being reproduced is searched beginning from a position obtained by subtracting a constant value K from an integer-time position of the predetermined average I frame interval.

On the other hand, in the case of F.B. reproduction, the succeeding I frame to be reproduced after the I frame now being reproduced is searched beginning from a position obtained by adding a constant value M to an integer-time position of the previously determined I frame average interval.

This reproducing method in order to shorten the detection time of I frames in F.F. and F.B. reproduction from a storage medium, bit streams stored thereon being constructed in such a way that the average interval between I frames becomes a predetermined interval value.

However, in this method, such an advantage cannot be expected when the average interval between I frames in the bit stream recorded in the storage medium is different from the predetermined average value or there is a variety of average intervals.

SUMMARY OF THE INVENTION

Accordingly, it is the object of the present invention to provide a method of reproducing picture data by fast forward or fast backward reproduction, which can shorten the time required to detect picture frames even if the average interval between the picture frames included in the moving picture data and compressed in accordance with the intra-frame method is not determined at a constant value.

To achieve the above-mentioned object, the present invention provides a method of reproducing picture data by fast forward or fast backward reproduction from moving picture data including picture frames belonging to a first picture frame group obtained by compressing picture data in accordance with intra-frame and picture frames belonging to a second picture frame group obtained by compressing picture data in accordance with inter-frame and further coded at a high efficiency by a high efficiency compression system, which comprises the steps of: obtaining at least one average interval between two adjacent picture frames belonging to the first picture frame group, during real time reproduction; setting a search start position of a first picture frame to be next reproduced after a second picture frame now being reproduced on the basis of the obtained average interval, during the fast forward or fast backward reproduction, the first and second picture frames belonging to the first picture frame group; and starting a search of the first picture frame to be reproduced next from the search start position.

Here, in the step of obtaining the average interval, it is preferable that the average interval is obtained by counting the number of picture frames belonging to the first picture frame group or counting the number of data bytes of picture frames belonging to the first picture group.

Further, in the step of obtaining the average interval, it is preferable that, in case of more than one average interval values, the average interval is obtained by forming a histogram that represents frequency of appearance of interval values between picture frames belonging to the first picture group, to obtain a plurality of peak frequency as the average interval values.

Further, the present invention provides a method of reproducing picture data by fast forward or fast backward reproduction from moving picture data including picture frames belonging to a first picture frame group obtained by compressing picture data in accordance with intra-frame and picture frames belonging to a second picture frame group obtained by compressing picture data in accordance with inter-frame prediction method and further coded at a high efficiency by a high efficiency compression system, which comprises the steps of: measuring a period of time from when real time reproduction mode data is given to when fast forward or fast backward reproduction mode data is given; when the measured period time does not reach a predetermined time, obtaining an average interval between two adjacent frames belonging to the first picture frame group by counting the number of picture frames belonging to the first picture frame group; when the measured time reaches the predetermined time, obtaining the average interval between two adjacent picture frames belonging to the first picture frame group by counting and averaging the number of data bytes between picture frames belonging to the first picture frame group; setting a search start position of a first picture frame to be next reproduced after a second picture frame now being reproduced on the basis of the obtained average interval, during the fast forward or fast backward reproduction, the first and second picture frames belonging to the first picture frame group; and starting a search of the first picture frame to be reproduced next from the search start position.

Further, the present invention provides a method of reproducing picture data by fast forward or fast backward reproduction from moving picture data including picture frames belonging to a first picture frame group obtained by compressing picture data in accordance with intra-frame method and picture frames belonging to a second picture frame group obtained by compressing picture data in accordance with inter-frame prediction method and further coded at a high efficiency by a high efficiency compression system, which comprises the steps of: obtaining a maximum interval value, a minimum interval value, and an average interval between two adjacent picture frames belonging to the first picture frame group, during real time reproduction; in the fast forward reproduction, setting a search start position of a first picture frame to be next reproduced after a second picture frame now being reproduced, the first and second picture frames belonging to the first picture frame group, by subtracting the minimum interval value from the average interval value to obtain a first deviation value, and by subtracting the first deviation value from an integer-time value of the average interval value; in the fast backward reproduction, setting a search start position of the first picture frame by subtracting the average interval value from the maximum interval value to obtaining a second deviation value, and by adding the second deviation value to another integer-time value of the average interval value; and starting a search of the first picture frame to be reproduced next from the search start position.

BRIEF DESCRIPTION OF THE DRAWINGS

FIGS. 3A to 3F are diagrams for assistance in explaining the data format examples.

DETAILED DESCRIPTION OF THE PREFERRED EMBODIMENTS

Preferred embodiments of the method of reproducing pictures by F.F. and F.B. reproduction on the basis of the high efficiency coded moving picture data according to the present invention will be described hereinbelow with reference to the attached drawings.

Figure 1:
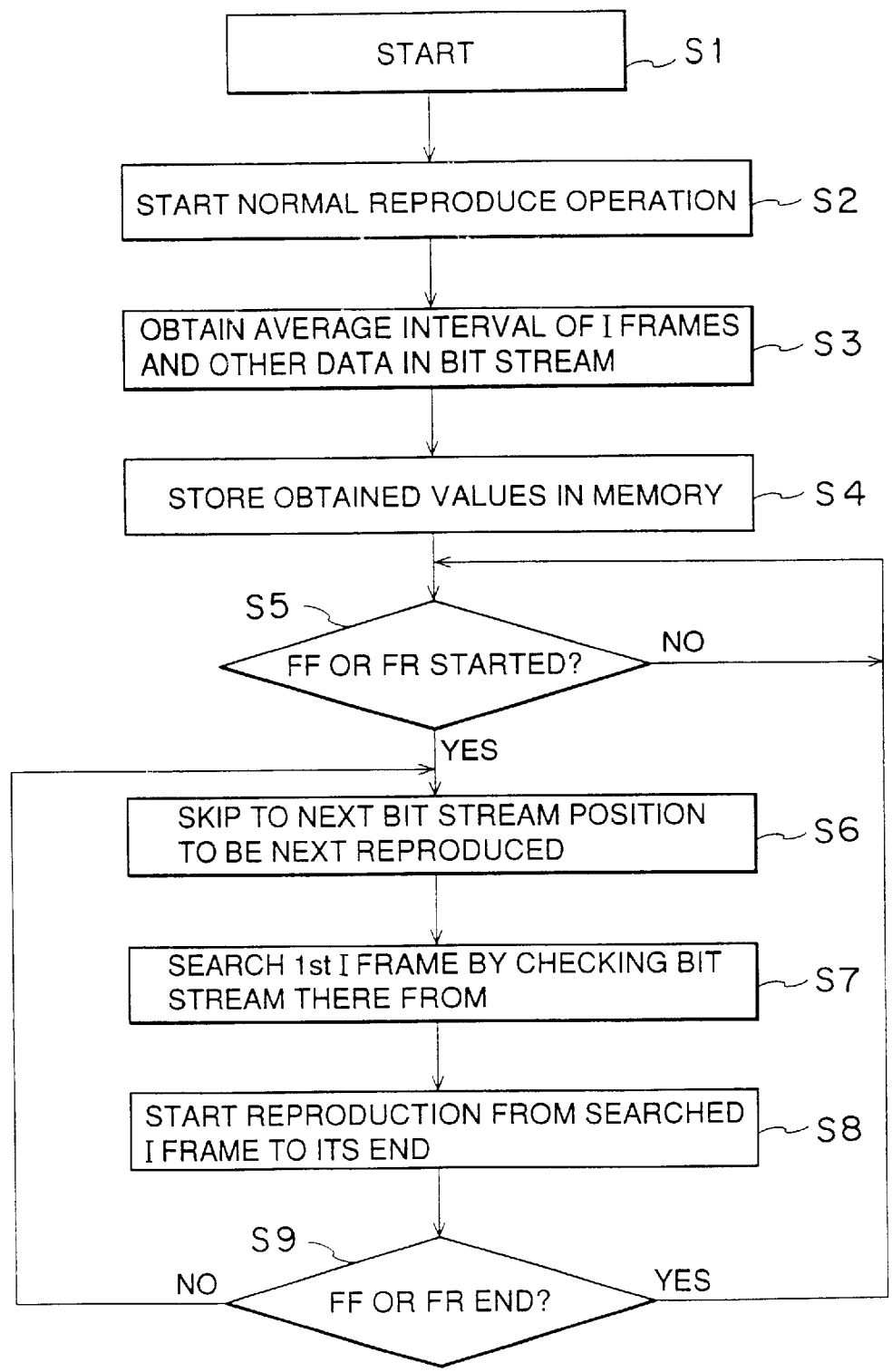
FIG. 1 is a flowchart showing an example of the procedure for obtaining an average interval between I frames and other data of a bit stream on the basis of the moving picture data coded at high a efficiency in accordance with the MPEG system, and the procedure for F.F. and F.B. reproduction on the basis of the obtained data.
Figure 2:
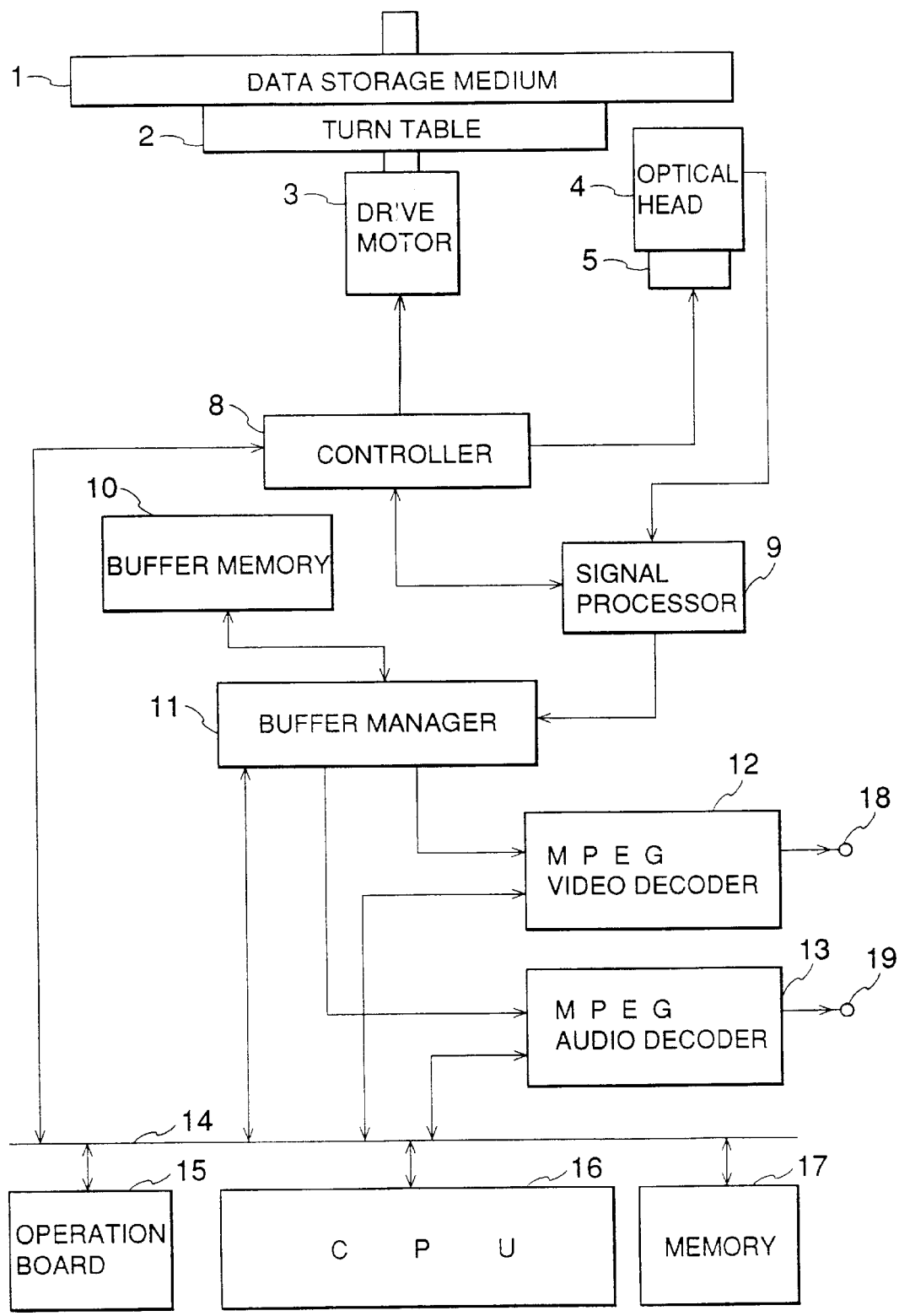
FIG. 2 is a schematic block diagram showing a reproducing apparatus, to which applied the method of reproducing pictures by F.F. and F.B. reproduction on the basis of the high efficiency coded moving picture data according to the present invention.

In FIG. 2, a storage medium 1 is an optical disk (e.g., CD-ROM), data stored thereon being a bit stream of high efficiency compressed moving picture data of I, P and B frames in accordance with the MPEG system. Not only the optical disk, any type of disk can be used as the storage medium such as magnetic disk, optical disk, magneto-optical disk, etc.

The optical disk 1 is fixed to a turntable 2 by a clamper (not shown) so as to be rotatable together with the turntable 2. Further, the turntable 2 is fixed to a drive shaft of a drive motor 3. The drive motor 3 is driven at a rotational speed and a rotational phase controlled by a control section 8 according to the reproduction signal obtained from a signal processor 9.

An optical head 4 is used to read data recorded on the optical disk 1. As is well known, the optical head 4 is so operated as to continuously trace the locus recorded on the optical disk 1 in accordance with the operation of a tracking servo-system (not shown). Video signals reproduced by the optical head 4 are processed by a signal processor 9 and then supplied to a buffer manager 11.

The optical head 4 is provided with a collimator lens, an objective lens, a polarizing beam splitter, a ¼ wave length plate, a polarizing beam splitter, an optical detector (e.g., four-division optical detector ), and a cylindrical lens.

In operation, a laser beam emitted by a laser beam source (a semiconductor laser) is passed through the collimator lens to obtain a parallel beam. Then, the parallel beam is allowed to be incident upon the objective lens through the polarizing beam splitter and the ¼ wave length plate. Therefore, the laser beam can be focused on the optical disk 1 through the objective lens as a minute-diameter optical spot.

The beam reflected from the optical spot on the optical disk 1 is allowed to be incident upon the polarizing beam splitter through the objective lens and the ¼ wave length plate. The beam reflected by the polarizing beam splitter is allowed to be incident upon the optical detector (e.g., four-division optical detector ) through the cylindrical lens.

Therefore, various electric signals including the recorded data, focus error data and tracking error data all reproduced from the optical disk 1 can be supplied from the optical detector of the optical head 4 to the signal processor 9. The signal processor includes an arithmetic circuit and an amplifier that generates electric signals including the recorded data, the focus error signal and the tracking error signal all reproduced from the optical disk 1.

In response to the focus error signal, the controller 8 generates a focus control signal that is supplied to a focus servo-system in the optical head 4. Further, in response to the tracking error signal, the controller 8 generates a tracking control signal that is supplied to a tracking servo-system and a drive motor 5. The optical head 4 is moved in a radial direction of the optical disk 1 by the drive motor 5.

Further, a seek operation signal is supplied from a CPU 16 to the controller 8, so that optical head 4 is also moved in the radial direction of the optical disk 1 for the seek operation.

The objective lens disposed in the optical head 4 is mounted on an actuator to which the focus and tracking control signals are applied by the focus and tracking servo-systems, respectively. In response to the focus and tracking control signals, the actuator drives and dislocates the objective lens in both the optical axis direction of the objective lens and the radial direction of the optical disk 1. The optical head 4 thus reproduce recorded data always in condition under control of the automatic position control by the control systems as described above.

Under the position control, the signal processor 9 supplies data reproduced from the optical disk 1 to a buffer manager 11. The reproduced data conforms to the CD (compact disk) standard on which audio data compressed at a high efficiency and moving picture data also compressed at a high efficiency in accordance with the MPEG system. In the reproducing apparatus shown in FIG. 2, there are also shown an MPEG video decoder 12, an MPEG audio decoder 13, a bus 14, an operation board 15 (or an external unit or an interface connected to an external line), and a memory 17.

The recorded data reproduced by the optical head 4 and supplied to the signal processor 9 has a data string. The data string has a time serial bit stream including moving picture data of I, P, and B frames coded at high efficiency in accordance with the MPEG system, audio data, and various headers. Here, the header data includes data sorts indicative of audio data, video data, and other data etc. The header data also includes time data for each data, frame numbers, sector numbers, etc.

FIGS. 3A to 3F are diagrams each for assistance in explaining the data format related to the moving picture data compressed at a high efficiency in accordance with the MPEG system and recorded on the optical disk 1 conforming to the CD (compact disk) standard. Particularly, FIG. 3B shows the recorded data format in a sequential sector section of the moving picture data compressed at a high efficiency on an optical disk conforming to the CD standard.

First, FIG. 3A shows the data contents to be recorded as one GOP (group of pictures) in sequence after the MPEG system header in each sector of FIG. 3B. In the GOP, a sequence header is located prior to the GOP; the GOP header is located after the sequence header; and sequential picture frames are arranged after the GOP header.

FIGS. 3C to 3F show the practical contents of the MPEG (system) header shown in FIG. 3B. Shown in FIGS. 3C to 3F are two types of time stamp PTS and DTS. The PTS implies presentation time stamp, i.e., data for representing a time at which the picture is actually displayed. And, the DTS designates decoding time stamp, i.e., data for representing a time at which data is given to the MPEG video decoder.

The MPEG system headers are used to discriminate the contents and the recorded modes of the picture data recorded in the sectors at which the MPEG system headers exist. This discrimination is made on the basis of the presence or absence of the time stamps included in the MPEG system headers or the differences in sorts of the time stamps existing in the MPEG system headers.

The time stamps PTS and DTS in the MPEG system headers processor 9 are stored in the buffer memory 10 via buffer manager 11. Here, the data string consists of a bit stream including at least the audio and picture data, and the headers including at least the various data indicative of the data sorts and the time data for each data, etc., as already explained.

The buffer manager 11 has a counter that counts the number of bytes of the data. Further, the buffer manager 11 writes the reproduced data transmitted from the signal processor 9 via bus 14 in sequence under control of the control signals given from the CPU 16 via bus 14 Further, the buffer manager 11 reads audio and video data included in the reproduced data strings stored in the buffer memory 10, and supplies them to the MPEG audio and video decoders 13 and 14, respectively in real time.

In the normal picture reproduction mode, in accordance with a program stored in the memory 17, the CPU 16 searches the sort data and the time data for each data included in the header portion of the reproduced data string stored in the buffer memory 10 via the buffer manager 11. This is to discriminate between the audio and video data and the reproduction times of the audio and video data.

The reproduced data from the buffer memory 10 is transferred through the buffer manager 11, in accordance with the requests of the respective MPEG video and audio decoders 12 and 13 corresponding to the data sort. In this case, the requests of the respective MPEG video and audio decoders 12 and 13 are outputted at such timings that the reproduced data can be kept continuous. The data are thus transferred in such a way that the continuity of the reproduced signals can be secured on the time axis by the MPEG video and audio decoders 12 and 13, respectively.

Further, the data are not continuous between prior to termination of reproduction and next start of reproduction at the picture reproduction start. In order to compensate for this, the MPEG video and audio decoders 12 and 13 are provided with picture reproduction start function at a as shown in FIGS. 3C and 3D indicate that the coded I or P frame starts somewhere in the sector in which the MPEG system header is located. In particular, the MPEG system header as shown in FIG. 3C indicates that this header is located at the initial sector of the respective video sequences in which a plurality of GOPs shown in FIG. 3A are connected.

Further, the time stamp PTS only exists in the MPEG system header as shown in FIG. 3E indicates that the coded B frame starts somewhere in the sector in which the MPEG system header is located. On the other hand, FIG. 3F shows that both the time stamps PTS and DTS do not exist in the MPEG system header. This indicates that the start boundaries of any of I, P, and B frames do not exist in the sector at which the MPEG system header is located.

The sequence header is constructed by various data indicative of the horizontal and vertical sizes of the picture, the aspect ratio, etc., in addition to the sequence header code. On the other hand, the GOP header is constructed by a group start code located at the head portion of GOP, a time code, data indicative of whether the GOP is a closed GOP or not, a broken link (when this bit is "1", a MPEG video decoder inhibits to decode a B frame existing between I and P frames constituting the GOP with the GOP header), etc. Further, it is determined that an I frame picture data is securely located immediately after the GOP header. Further, in the case of the bit stream in which I, P, and B frames of the moving picture data coded at a high efficiency by the MPEG system are arranged, the coding is executed in such a way that I frames are arranged roughly at regular interval on an average in the bit stream.

With reference to FIG. 2 again, the bit stream (data string) reproduced from the optical disk 1 by the optical header 4 is supplied to and processed by the signal processor 9 under control of the control signals given from the CPU 16 via bus 14. The signals processed by the signal predetermined timing. For this function, various method can be considered such that a command is given from the CPU 16 to the MPEG video and audio decoders 12 and 13 via bus 14. Or, data including the time stamps are given to the MPEG video and audio decoders 12 and 13 so that the picture reproduction can be started at a predetermined timing on the basis of the given data.

As described above, when the audio data are transferred from the buffer memory 10 to the MPEG audio decoder 13 via buffer manager 11, the MPEG audio decoder 13 outputs the reproduced audio data signals obtained by decompressing (decoding) the compressed audio data supplied thereto. In the same way, when the video data are transferred from the buffer memory 10 to the MPEG video decoder 12 via buffer manager 11, the MPEG video decoder 12 outputs the reproduced video data signals obtained by decompressing (decoding) the compressed picture data supplied thereto.

Accordingly, it is possible to output the reproduced audio data signals from the MPEG audio decoder 13 continuously on the time axis, and the reproduced picture data signals from the MPEG video decoder 12 continuously on the time axis.

As already explained, in F.F. or F.B. reproduction from bit stream constructed with I, P, and B frames with the I frames being arranged roughly at regular intervals on an average, a period of time including the following three periods of time is necessary to reproduce the picture data of sequential I frames: (1) a period of time to skip to a bit stream position at which the succeeding picture reproduction is to be started; (2) a period of time to detect an I frame after the bit stream reproduction has been started from the skipped position; and (3) a period of various time to reproduce the total detected I frames.

In the case of the optical disk (CD-ROM) for storing the moving picture data coded at a high efficiency on the basis of the MPEG system, the I frames are conventionally arranged in the bit stream at predetermined regular intervals (e.g., at 15 frame intervals, that is, at about 0.5-sec intervals in the displayed pictures, or at 60 frame intervals, that is, at about 2-sec intervals in the displayed pictures). However, not only these constant frame intervals, I frames can be arranged in a bit stream with a variety of intervals.

In order to smoothly obtain data from an optical disk by F.F. or F.B. reproduction, it is necessary to search and reproduce sequential I frames at a short time, as described above. To search the sequential I frames at a short time, when the average intervals of the I frames arranged in a bit stream to be reproduced are previously known, it is possible to adopt the already explained method as disclosed in Japanese Patent Laid-Open No. 6(1994)-276485 such that: in F.F. reproduction, the succeeding I frame to be reproduced after the I frame now being reproduced is searched beginning from a position obtained by subtracting a constant value K from a position integer-times of the previously determined averaged interval; on the other hand, in F.B. reproduction, the succeeding I frame to be reproduced after the I frame now being reproduced is searched beginning from a position obtained by adding a constant value M to a position integer-times of the previously determined averaged interval.

However, there is a case such that I frame intervals varies with optical disks. Or, variety of unknown I frame intervals are adopted in one optical disk. In these cases, it is impossible to adopt the method as disclosed by the Japanese Laid-Open Patent.

Accordingly, the feature of the present invention for reproducing pictures by F.F. or F.B. reproduction from moving picture data coded at a high efficiency is as follows:

In the case where only I frame pictures are selected and reproduced by F.F. or F.B. reproduction, during the normal speed (real time) reproduction, various data such as average interval data between sequential I frames, the maximum and minimum values of the intervals, etc., are obtained.

Then, In F.F. or F.B. reproduction after the normal speed reproduction, smooth moving pictures can be obtained by setting the search start positions at which the sequential I frames can be searched at a short time, on the basis of the data among the various data such as the average intervals between the I frames, the maximum and minimum values of the intervals, etc. obtained in the normal picture reproduction mode.

Here, it is possible to obtain the average intervals between the I frames and the maximum and minimum values of the intervals on the basis of various data included in the reproduced bit stream, for instance, frame numbers, sector numbers, frame sort data (i.e., I, P, and B frames), byte number data counted by the counter of the buffer manager 11, etc. The average, maximum, and minimum intervals obtained in the normal picture (speed) reproduction mode are all stored in a memory for use in F.F. or F.B. reproduction.

The reproduction method according to the present invention will be explained in detail for the case where intervals of the I frames in the bit stream from an optical disk are roughly constant value all over the bit stream recorded on the optical disk.

An interval between two adjacent I frames can be used as the average interval between sequential I frames arranged in the bit stream recorded in the optical disk. Here, the interval between two I frames is obtained by calculation on the basis of a difference between the frame numbers of the two adjacent I frames.

Further, an average value of intervals between succeeding I frames can be used as the average interval between sequential I frames arranged in the bit stream recorded in the optical disk. This average value is obtained by calculation on the basis of differences between sequential I frames.

In practice, the data indicative of the I frames and the frame number data both obtained by decoding the bit stream with the MPEG video decoder 12 are applied to the CPU 16. Then, the CPU 16 executes predetermined calculations on the basis of the frame numbers of the sequential frames. For example, if 30 picture frames are recorded in 75 sectors, and an I frame exists in every 15 picture frames, then average interval between I frames is $(75 \times 15) \div 30 = 37.5$ sectors. The calculated average interval is stored in the memory 17. The stored average interval is then read out for further calculation in F.F. or F.B. reproduction.

In addition to the first method to obtain the average I frame interval by calculation on the basis of I frame numbers as described above, there is the second method to obtain the average I frame interval.

In the second method, the number of bytes counted by the counter of the buffer manager 11 and data indicative of the I frames obtained by the decoding operation of the MPEG video decoder 12 are applied to the CPU 16. Then, the CPU 16 obtains an average value of the intervals between the sequential I frames on the basis of the difference in the number of bytes between two adjacent I frames in the bit stream reproduced from the option disk. Here, the unit of the interval is one sector length (for example, 2296 bytes).

The CPU 16 executes the respective predetermined calculations in accordance with the first and second method and stores the first and second average I frame interval data in the memory 17. Here, the first and second average I frame interval data are obtained on the basis of the first and second methods, respectively.

Then, when the reproduction mode is shifted from the normal reproduction mode to F.F or F.B. reproduction mode within a predetermined period of time, the first average I frame interval data is used for calculation of the search start position of the succeeding I frame in F.F or F.B. reproduction.

On the other hand, when the reproduction mode is shifted from the normal reproduction mode to F.F or F.B. reproduction mode after the predetermined period of time lapses, the second average I frame interval data is used for calculation of the search start position of the succeeding I frame in F.F or F.B. reproduction.

Here, the first and second average I frame interval value data are selectively used in order to calculate the search start position of the succeeding I frame in F.F or F.B. reproduction. This is done by discriminating whether the data entry time difference reaches a predetermined value or not. Here, the data entry time difference is a difference between when the normal reproduction mode data is applied to the operation board 15 and when the F.F. or F.B. reproduction mode data is applied to the operation board 15.

In this case, it is preferable to obtain the first average I frame interval data within a predetermined short time in the normal reproduction mode. Further, it is preferable to obtain the second average I frame interval data within the whole time period in the normal picture reproduction operation mode.

Further, there is a case where data indicative of dispersion of the interval values between the sequential I frames is required to calculate the search start position of the succeeding I frame in F.F. or F.B. reproduction operation, in addition to the first and second average I frame interval data. In this case, both the maximum and minimum interval values between the I frames are necessary within the sector length during which the average I frame interval value has been obtained. That is, the maximum and minimum interval values are used which are obtained by the calculation of the second average I frame interval data.

In practice, when F.F. or F.B. reproduction mode data is applied to the operation board 15 during the normal reproduction mode, the normal reproduction mode is changed to F.F. or F.B. reproduction mode. The memory 17 still keeps storing various data such as first and second average I frame interval data and the maximum and minimum interval data for use in quick I frame search in F.F. or F.B. reproduction.

When the normal reproduction mode is shifted to F.F. or F.B. reproduction mode within the predetermined period of time, the first average I frame interval data is read from the memory 17 for use in the calculations of F.F. or F.B. reproduction. The read data is used as the data for searching the succeeding I frame to be reproduced after the already reproduced I frame.

Next, When the normal reproduction mode is shifted to F.F. or F.B. reproduction mode after the predetermined period lapses, the second average I frame interval data, and the maximum and minimum interval value data are read from the memory 17 for use in the calculations of F.F. or F.B. reproduction. The read data are used as the data for searching the succeeding I frame to be reproduced after the already reproduced I frame.

In more detail, in F.F. reproduction, the succeeding I frame to be reproduced after the already reproduced I frame is searched beginning from a position, relative to the last I frame position, obtained by subtracting a constant value K from the integer-times of the second average I frame interval data. On the other hand, in F.B. reproduction, the succeeding I frame to be reproduced after the already reproduced I frame is searched beginning from a position relative to the last I frame position, obtained by adding a constant value M to the integer-times of the second average I frame interval data.

A practical example of the above-mentioned search point will be described in further detail hereinbelow. There is a case where the maximum and minimum interval values between I frames in the bit stream are 43 sector lengths and 36 sector lengths, respectively. In this case, the succeeding I frame is selected by accessing a position 36 sector length away from the head of the present I frame now being reproduced. It is thus possible to obtain the aimed succeeding I frame at the worst within seven sector lengths between the 36 sector lengths and the 43 sector lengths.

Further, there is a case where the second average I frame interval data is 39.86 sector lengths. In this case, while an I frame is being reproduced in F.F. reproduction, the succeeding I frame is selected by accessing the position (N×39.86+ 36) length (where N=0, 1, 2, 3, . . . which increases with increasing F.F. speed-up rate) away from the head of the I frame now being reproduced. It is thus possible to obtain the aimed succeeding I frame at the worst within seven sector lengths. On the other hand, while an I frame is being reproduced in F.B. reproduction, the succeeding I frame is selected by accessing the position (N×39.86+43) length (where N=0, 1, 2, 3, . . . which increases with increasing F.B. speed-up rate) away from the head of the I frame now being reproduced. It is also possible to obtain the aimed succeeding I frame at the worst within seven sector lengths.

In other words, when the second average I frame interval data is 39.86 sector lengths, the sector lengths from the head of the I frame now being reproduced in F.F. reproduction is $$f\{39.86 \times N - 3.86\} \text{ sector lengths} \qquad \text{(FF)}$$

where $f\{n\}$ is the maximum natural number smaller than n.

On the other hand, in F.B. reproduction, the sector lengths from the head of the I frame now being reproduced is $$g\{39.86 \times N + 3.14\} \text{ sector lengths} \qquad \text{(FB)}$$

where $g\{n\}$ is the minimum natural number larger than n.

In the formulae (FF) and (FB), N is a numerical value (N=1, 2, 3, . . . ) which increases with increasing speed-up ratio of F.F. or F.B. reproduction.

In summary, it is possible to search the aimed I frame immediately by accessing the position an interval as expressed by the above formulae (FF) and (FB) away from the present I frame.

Further, the formulae (FF) and (FB) can be expressed in more generic forms by (FF1) and (FB1) in F.F. and F.B. reproduction, respectively, as follows:

$$f\{N \times A - K\} \qquad \text{(FF1)}$$

$$g\{N \times A + M\} \qquad \text{(FB1)}$$

where $f\{n\}$ is the maximum natural number smaller than n, $g\{n\}$ is the minimum natural number larger than n, and A is the second average I frame interval data.

Further, in the formulae (FF1) and (FB1), N is a numerical value (N=1, 2, 3, . . . ) which increases with increasing speed-up ratio of F.F. and F.B. reproduction. Further, deviation K corresponds to A–the minimum I frame interval value, and deviation M to the maximum I frame interval value–A. Therefore, in the formulae (FF) and (FB), 3.86= 39.86−36 and 3.14=43−39.86, respectively.

In this case, I frames are arranged in the bit stream in such a way that the interval value between two I frames does not differ markedly from one another under consideration of the capacity of the memory provided in the MPEG decoder. Thus, the difference between the maximum and minimum interval values between I frames are so determined as not to become extraordinarily large numerical values.

Therefore, the values K and M of the formulae (FF1) and (FB1) can be determined as appropriate numerical values less than 10, for instance for quick I frame search in F.F. and F.B. reproduction. In addition, instead of the second average I frame interval data, the first average I frame interval data can be used in the formulae (FF1) and (FB1).

The first and second methods described above are effective when there is one average I frame interval in the bit stream recorded on a single optical disk.

Next, the method for the case where there are a plurality of average I frame intervals in the bit stream recorded on a single optical disk will be discussed below. In this case, the average I frame interval can be obtained as follows:

Firstly, data indicative of the number of bytes counted by the counter provided in the buffer manager 11 and data indicative that the current data represents an I frame obtained by the decoding operation of the MPEG video decoder 12 are both given to the CPU 16.

Next, a histogram is formed that represents the frequency of appearance of the interval values between two I frames obtained in accordance with the calculation of the CPU 16. Here, the unit interval is one sector length, that is, 2296 bytes. The histogram is formed on the basis of the differences in the number of bytes between the two adjacent I frames in the bit stream reproduced from the optical disk.

When a plurality of picture data are recorded on the optical disk, and a half of the data has an average I frame interval X and the other half has another average I frame interval Y, the histogram shows two peak frequency of appearance of the interval values corresponding to X and Y. Suppose that the first data is reproduced, the histogram shows the peak frequency corresponding to X, and then the second data is reproduced, the histogram shows the peak frequency corresponding to Y. Then, the data X and Y, and the data indicative of the range of sectors on which the first and second data exist on the optical disk are stored into the buffer memory 10.

Here, suppose that after the fifth data is reproduced, the second data is again reproduced in F.F. or F.B. reproduction. In this case, the data Y and range data of sectors on which the second data exists are read from the buffer memory 10 and applied to the CPU 16.

Then, the CPU 16 carries out calculation on the basis of the formulae (FF1) and (FB1) to obtain the search start positions of I frames of the second data for quick I frame search in F.F. or F.B. reproduction.

As described above, the method of reproducing pictures according to the present invention is to select and reproduce I frames only from moving picture data including I, P, and B frames coded at a high efficiency in accordance with the high efficiency compression coding system.

During the normal reproduction mode, data indicative of the average interval value between two picture frames are obtained for only the I frames, developed on the time axis in sequence.

Next, in F.F. or F.B. reproduction after the normal reproduction, the search start position of the I frame to be next reproduced from an already reproduced I frames is determined on the basis of the data indicative of the average interval value between the I frames.

Therefore, even if the interval between the sequential I frames in the bit stream to be reproduced is not known, it is possible to shorten the time required to detect the I frame from the skipped position, after the bit stream has been started to be reproduced. As a result, it is possible to increase the number of reproduced pictures in unit time and thereby to obtain an excellent reproduced pictures of smooth movement.

What is claimed is:

1. A method of reproducing picture data by fast forward or fast backward reproduction from moving picture data including picture frames belonging to a first picture frame group obtained by compressing picture data in accordance with intra-frame method and picture frames belonging to a second picture frame group obtained by compressing picture data in accordance with inter-frame prediction method and further coded at a high efficiency by a high efficiency compression system, which comprises the steps of:

obtaining at least one average interval between two adjacent picture frames belonging to the first picture frame group, during real time reproduction;

setting a search start position of a first picture frame to be next reproduced after a second picture frame now being reproduced on the basis of the obtained average interval, during the fast forward or fast backward reproduction, the first and second picture frames belonging to the first picture frame group; and starting a search of the first picture frame to be reproduced next from the search start position.

2. The method of claim 1, wherein the average interval obtaining step includes the step of counting the number of picture frames belonging to the first picture frame group.

3. The method of claim 1, wherein the average interval obtaining step includes the step of counting the number of data bytes between picture frames belonging to the first picture group.

4. The method of claim 1, in case of more than one average interval values, the average interval obtaining step including the step of forming a histogram that represents frequency of appearance of interval values between picture frames belonging to the first picture group to obtain a plurality of peak frequency as the average interval values.

5. A method of reproducing picture data by fast forward or fast backward reproduction from moving picture data including picture frames belonging to a first picture frame group obtained by compressing picture data in accordance with intra-frame method and picture frames belonging to a second picture frame group obtained by compressing picture data in accordance with inter-frame prediction method and further coded at a high efficiency by a high efficiency compression system, which comprises the steps of:

measuring a period of time from when real time reproduction mode data is given to when fast forward or fast backward reproduction mode data is given;

when the measured period time does not reach a predetermined time, obtaining an average interval between two adjacent frames belonging to the first picture frame group by counting the number of picture frames belonging to the first picture frame group;

when the measured time reaches the predetermined time, obtaining the average interval between two adjacent picture frames belonging to the first picture frame group by counting the number of data bytes of picture frames belonging to the first picture frame group;

setting a search start position of a first picture frame to be next reproduced after a second picture frame now being reproduced on the basis of the obtained average interval, during the fast forward or fast backward reproduction, the first and second picture frames belonging to the first picture frame group; and starting a search of the first picture frame to be reproduced next from the search start position.

6. A method of reproducing picture data by fast forward or fast backward reproduction from moving picture data including picture frames belonging to a first picture frame group obtained by compressing picture data in accordance with intra-frame method and picture frames belonging to a second picture frame group obtained by compressing picture data in accordance with inter-frame prediction method and further coded at a high efficiency by a high efficiency compression system, which comprises the steps of:

obtaining a maximum interval value, a minimum interval value, and an average interval between two adjacent picture frames belonging to the first picture frame group, during real time reproduction;

in the fast forward reproduction, setting a search start position of a first picture frame to be next reproduced after a second picture frame now being reproduced, the first and second picture frames belonging to the first picture frame group, by subtracting the minimum interval value from the average interval value to obtain a first deviation value, and by subtracting the first deviation value from an integer-time value of the average interval value;

in the fast backward reproduction, setting a search start position of the first picture frame by subtracting the average interval value from the maximum interval value to obtaining a second deviation value, and by adding the second deviation value to another integer-time value of the average interval value; and starting a search of the first picture frame to be reproduced next from the search start position.

7. The method of claim 6, wherein the interval value obtaining step includes the step of counting the number of picture frames belonging to the first picture frame group.

8. The method of claim 6, wherein the interval value obtaining step including the step of counting the number of data bytes between picture frames belonging to the first picture frame group.

\* \* \* \* \*